(No Model.)

A. H. REID.
MILK TESTING DEVICE.

No. 446,469. Patented Feb. 17, 1891.

Witnesses:

Inventor:

UNITED STATES PATENT OFFICE.

ALBAN H. REID, OF PHILADELPHIA, PENNSYLVANIA.

MILK-TESTING DEVICE.

SPECIFICATION forming part of Letters Patent No. 446,469, dated February 17, 1891.

Application filed April 15, 1890. Serial No. 348,016. (No model.)

*To all whom it may concern:*

Be it known that I, ALBAN H. REID, of Philadelphia, in the county of Philadelphia and State of Pennsylvania, have invented certain Improvements in Milk-Testing Devices, of which the following is a specification.

My invention relates to that class of instruments which are used more particularly for measuring the fatty elements of milk after they have been separated from the remaining portion. It is now the common practice to treat milk with acids and ether, which causes the fatty portions to separate from the remaining portion and rise to the top.

It is the object of my invention to provide a simple instrument by which this thin stratum of fatty matter may be quickly and accurately measured. To this end I provide an ordinary test-tube or other suitable holder for the milk to be tested. After the milk has been treated to cause a separation of the fat, I introduce into the tube a rubber or other closely-fitting plunger carrying a graduated tube of small diameter, so that as the plunger is forced downward into the tube the fatty matters are compelled to rise within the graduated tube, so that the small quantity of fat which would otherwise be measured with difficulty produces in the tube a long column, the volume of which may be readily ascertained by reading the graduations upon the tube.

Figure 1:
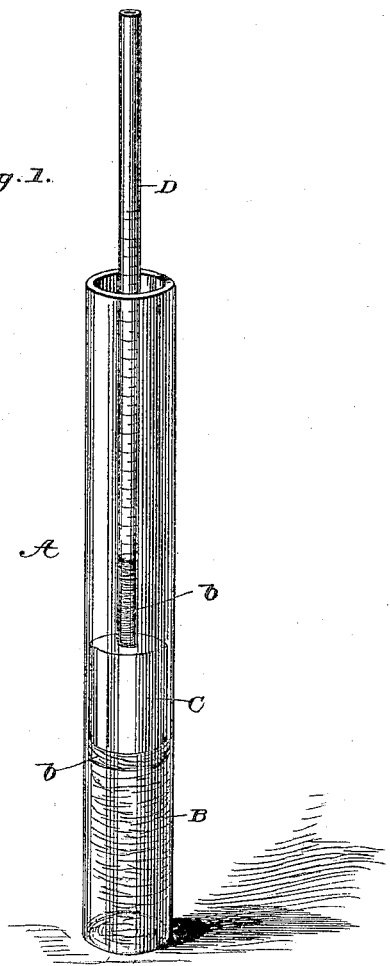
Figure 2:
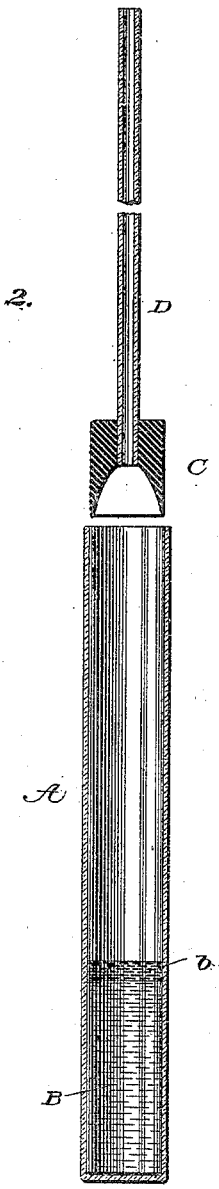

In the accompanying drawings, Figure 1 is a perspective view of my instrument as it appears in operative condition. Fig. 2 is a vertical section through the same with its parts separated.

In the drawings, A represents a glass tube, such as a test-tube, closed at the bottom and open at the top.

B represents a body of milk contained in the tube and treated in such manner that the fatty stratum *b* has risen to the top.

C is a plunger or piston, of rubber or other suitable material, closely fitting the interior of the tube, and preferably made concave on its under side.

D is a graduated glass tube opening at its lower end through the plunger and fixed firmly thereto as a means of thrusting the same forcibly into the tube upon the fatty stratum. By forcing the plunger gradually downward it is caused to depress the stratum *b*, which is driven upward through the center of the tube, as shown in Fig. 1.

Having thus described my invention, what I claim is—

1. The test-tube or holder B, in combination with the plunger C and the transparent tube D, fixed to the plunger and provided with graduations, whereby the contents of the holder may be caused to rise in the transparent tube and its volume permitted to be read in connection with the graduations thereon.

2. The transparent tube or holder B, in combination with the plunger C and the graduated transparent tube D fixed thereto.

3. In a milk-testing device, the test-tube or holder B, in combination with the plunger having its lower end recessed from near its outer edge, and the tube fixed to said plunger and communicating with the recessed end through a restricted opening, whereby the contents of the holder will, on pressure being applied to the plunger, act to force its sides into intimate contact with the holder, thereby preventing the escape of the contents around the plunger.

In testimony whereof I hereunto set my hand, this 20th day of March, 1890, in the presence of two attesting witnesses.

A. H. REID.

Witnesses:
 EDW. H. JACOB,
 GABRIEL C. KNECHT.